US012699924B2

(12) United States Patent
Chisholm et al.

(10) Patent No.: US 12,699,924 B2
(45) Date of Patent: Aug. 4, 2026

(54) NATURAL LANGUAGE QUERY PROCESSING BASED ON MACHINE LEARNING TO PERFORM A TASK

(71) Applicant: International Business Machines Corporation, Armonk, NY (US)

(72) Inventors: Bryson Chisholm, Stevensville (CA); Shikhar Kwatra, San Jose, CA (US); Shaikh Shahriar Quader, Oshawa (CA); Ayesha Bhangu, Whitby (CA); Jack Zhang, Unionville (CA); Shabana Dhayananth, Brampton (CA); Tarandeep Kaur Randhawa, Stratford (CA)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 17/957,006

(22) Filed: Sep. 30, 2022

(65) Prior Publication Data

US 2024/0112074 A1    Apr. 4, 2024

(51) Int. Cl.
    *G06N 20/00*        (2019.01)
    *G06F 16/334*       (2025.01)
(52) U.S. Cl.
    CPC ......... *G06N 20/00* (2019.01); *G06F 16/3344* (2019.01)
(58) Field of Classification Search
    CPC ... G06N 20/00; G06F 16/3344; G06F 40/186; G06F 40/30; G06F 40/35
    See application file for complete search history.

(56) References Cited

U.S. PATENT DOCUMENTS

| | | | |
|---|---|---|---|
| 8,140,556 B2 | 3/2012 | Rao et al. | |
| 9,135,572 B2 | 9/2015 | Björk et al. | |
| 9,779,133 B2 | 10/2017 | Bhagavan | |
| 11,989,627 B1* | 5/2024 | Bhise | G06F 18/2113 |
| 2020/0134032 A1 | 4/2020 | Lin et al. | |
| 2020/0336450 A1* | 10/2020 | Gao | H04L 51/214 |
| 2021/0081720 A1* | 3/2021 | Polleri | G06F 18/2155 |
| 2022/0180209 A1* | 6/2022 | Xu | G06N 3/08 |
| 2023/0146336 A1* | 5/2023 | Wang | G06N 3/045 |
| | | | 705/26.1 |

(Continued)

OTHER PUBLICATIONS

Karmaker, Shubhra Kanti, et al. "Automl to date and beyond: Challenges and opportunities." Acm computing surveys (csur) 54.8 (2021): 1-36 (Year: 2021).*

(Continued)

*Primary Examiner* — Andrew T McIntosh
(74) *Attorney, Agent, or Firm* — Harrity & Harrity, LLP

(57)            ABSTRACT

An embodiment of the present invention extracts information from a natural language query requesting performance of a task. A machine learning model determines a task that corresponds to the task requested by the natural language query based on the extracted information. A query is generated for retrieving data from a plurality of different data sources based on the extracted information. The data for the determined task is retrieved from the plurality of different data sources based on the generated query. The determined task is performed using the retrieved data. Present invention embodiments include a method, system, and computer program product for processing a natural language query in substantially the same manner described above.

20 Claims, 6 Drawing Sheets

(56) References Cited

U.S. PATENT DOCUMENTS

2023/0394040 A1* 12/2023 Gupta .............. G06F 16/90324

OTHER PUBLICATIONS

Cambronero, José P., Jürgen Cito, and Martin C. Rinard. "Ams: Generating automl search spaces from weak specifications." Proceedings of the 28th ACM Joint Meeting on European Software Engineering Conference and Symposium on the Foundations of Software Engineering. 2020 (Year: 2020).*

José Luis Neves, et al., "Demonstrating AI-enabled SQL Queries over Relational Data using a Cognitive Database", https://www.kdd.org/kdd2018/files/deep-learning-day/DLDay18_paper_20.pdf, Aug. 2018, 9 pages.

Microsoft Learn, "Deploy machine learning models to multiple data sources", https://docs.microsoft.com/en-us/azure/architecture/example-scenario/ai/multiline-model-deployment, downloaded from the internet on Sep. 28, 2022, 6 pages.

"Create AutoML UI Experiment", https://docs.oracle.com/en/database/oracle/machine-learning/oml-automl-ui/amlui/create-experiment.html, downloaded from the internet on Sep. 28, 2022, 7 pages.

Julian Forero, "Analysts Can Now Use SQL to Build and Deploy ML Models with Snowflake and Amazon SageMaker Autopilot", https://www.snowflake.com/blog/analysts-can-now-use-sql-to-build-and-deploy-ml-models-with-snowflake-and-amazon-sagemaker-autopilot/, Dec. 6, 2021, 5 pages.

Fuat Bask, et al., "DBPal: A Learned NL-Interface for Databases", SIGMOD '18: Proceedings of the 2018 International Conference on Management of Data, https://dl.acm.org/doi/pdf/10.1145/3183713.3193562, May 27, 2018, 4 pages.

"Meet Turing by Borealis AI, an AI-powered text to SQL database interface", https://www.borealisai.com/en/blog/meet-turing-ai-powered-text-sql-database-interface/, Jun. 15, 2021, 8 pages.

Nodira Khoussainova, et al., "SnipSuggest: Context-Aware Autocompletion for SQL", https://www.vldb.org/pvldb/vol4/p22-khoussainova.pdf, Aug. 29, 2011, 12 pages.

Fu Sun, et al., "K-AID: Enhancing Pre-trained Language Models with Domain Knowledge for Question Answering", https://arxiv.org/ftp/arxiv/papers/2109/2109.10547.pdf, Nov. 1, 2021, 10 pages.

"Assistant—IBM Documentation", https://www.ibm.com/docs/en/cognos-analytics/11.1.0?topic=explorations-assistant, downloaded from the internet on Sep. 30, 2022, 2 pages.

"Machine Learning for SQL", https://www.oracle.com/database/technologies/datawarehouse-bigdata/, downloaded from the internet on Jul. 14, 2022, 4 pages.

"MindsDB Documentation", https://docs.mindsdb.com/, downloaded from the internet on Jul. 14, 2022, 4 pages.

"The Create Model statement to train AutoML Tables models", https://cloud.google.com/bigquery-ml/docs/reference/standard-sql/bigq . . . , downloaded from the internet on Jul. 14, 2022, 9 pages.

"AutoML Tables documentation", Google Cloud, about:reader?url=https%3A%2F%2Fcloud.google.com%2Fautoml-tab . . . , downloaded from the internet on Jul. 14, 2022, 1 page.

"Cloud AutoML Custom Machine Learning Models", Google Cloud, https://cloud.google.com/automl, downloaded from the internet on Sep. 30, 2022, 4 pages.

John Pocknell, "Make it Automatic: Tuning SQL with AI", Aug. 20, 2020, www.datanami.com, 6 pages.

* cited by examiner

300

305
DEFINE A SET OF ANALYTICAL TASKS

310
FOR EACH TASK, CREATE A TEMPLATE ROUTINE

315
FOR EACH TASK, CREATE ONE OR MORE NL EXPRESSION TEMPLATES

320
GENERATE TRAINING DATA AND TRAIN MODEL

325
CREATE API END POINTS FOR EXTENDING AND ADDING TASKS, ROUTINES, AND NL EXPRESSIONS

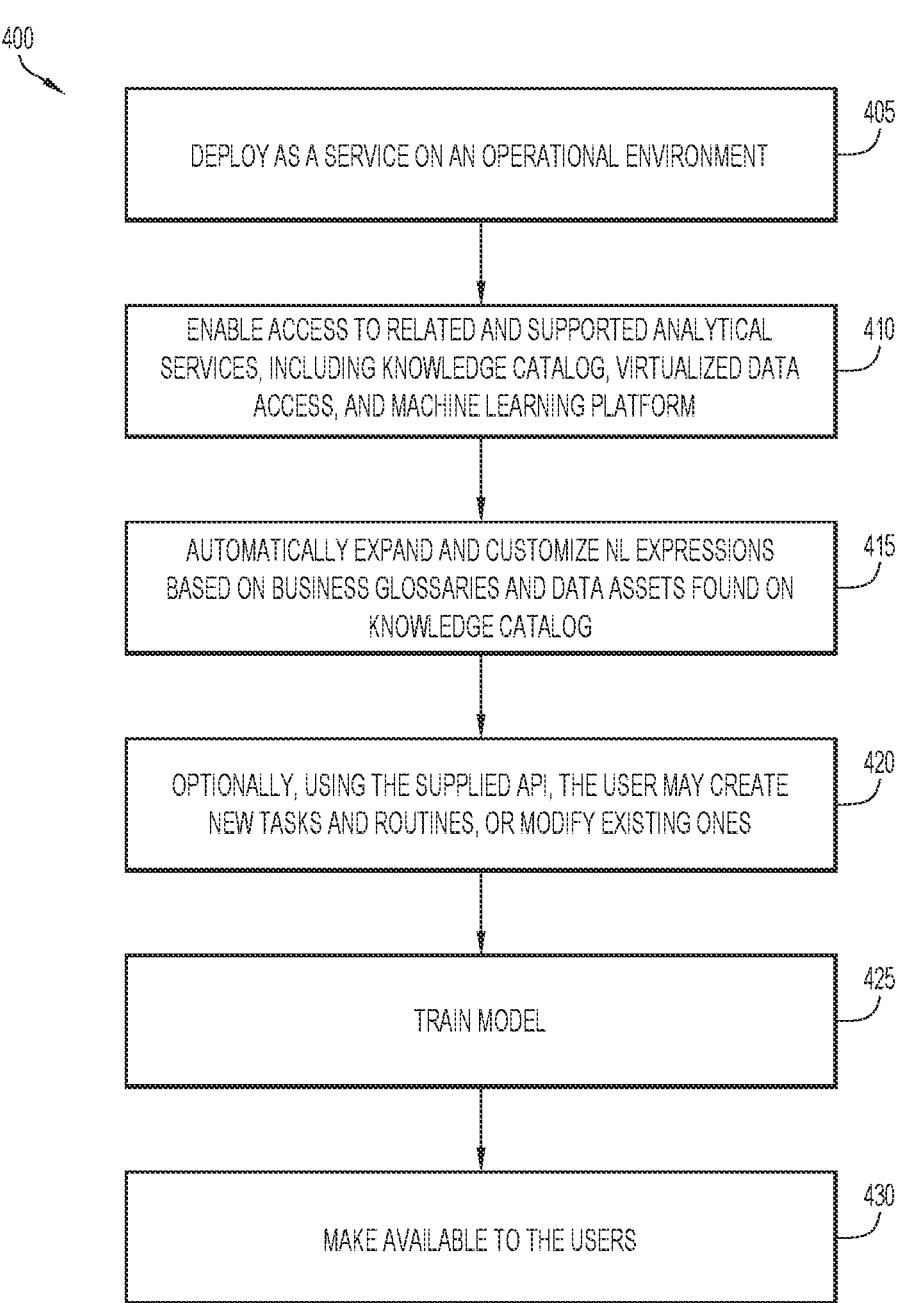

400

DEPLOY AS A SERVICE ON AN OPERATIONAL ENVIRONMENT — 405

ENABLE ACCESS TO RELATED AND SUPPORTED ANALYTICAL SERVICES, INCLUDING KNOWLEDGE CATALOG, VIRTUALIZED DATA ACCESS, AND MACHINE LEARNING PLATFORM — 410

AUTOMATICALLY EXPAND AND CUSTOMIZE NL EXPRESSIONS BASED ON BUSINESS GLOSSARIES AND DATA ASSETS FOUND ON KNOWLEDGE CATALOG — 415

OPTIONALLY, USING THE SUPPLIED API, THE USER MAY CREATE NEW TASKS AND ROUTINES, OR MODIFY EXISTING ONES — 420

TRAIN MODEL — 425

MAKE AVAILABLE TO THE USERS — 430

FIG.4

> CREATE A MODEL M WITH ASSET A USING COLUMN C AS TARGET ——262

| TRAININGACCURACY | ESTIMATOR |
|---|---|
| 0.9545454545454546 | RANDOMFORESTCLASSIFIER |
| 0.9545454545454546 | RANDOMFORESTCLASSIFIER |
| 0.9696969696969697 | RANDOMFORESTCLASSIFIER |
| 0.9696969696969697 | RANDOMFORESTCLASSIFIER |
| 0.9545454545454546 | RANDOMFORESTCLASSIFIER |
| 0.9545454545454546 | RANDOMFORESTCLASSIFIER |
| 0.9696969696969697 | RANDOMFORESTCLASSIFIER |
| 0.9696969696969697 | RANDOMFORESTCLASSIFIER |

8 RECORD(S) SELECTED.

NATURAL LANGUAGE QUERY PROCESSING BASED ON MACHINE LEARNING TO PERFORM A TASK

BACKGROUND

1. Technical Field

Present invention embodiments relate to natural language processing and machine learning, and more specifically, to processing a natural language query based on machine learning to perform a task, such as generating and training a machine learning model.

2. Discussion of the Related Art

Some of the most time and effort consuming processes with respect to building machine learning (ML) models are data collection and preparation. More specifically, these processes consume around 60%-80% of a data scientist's schedule. There are a variety of automated machine learning (AutoML/AutoAI) tools that generate machine learning (ML) models and interact with data in their own unique way. These tools may process structured relational data, interact with non-relational databases, and/or even directly process the data. Depending on the tool used, a data scientist may also be required to export data and prepare the data in the correct format that the tool expects. Since there may be limited storage and memory on these types of tools, all relevant data may not be able to be directly imported or used to build machine learning (ML) models.

In addition, the automated machine learning (AutoML/ AutoAI) tools lack support for intelligent sampling of data. Typically, a required sampling technique is problem-specific and needs input from a user. Limiting available sampling techniques hinders data scientists and may further disrupt a machine learning (ML) model building process.

SUMMARY

According to one embodiment of the present invention, a system processes a natural language query, and comprises one or more memories and at least one processor coupled to the one or more memories. The system extracts information from a natural language query requesting performance of a task. A machine learning model determines a task that corresponds to the task requested by the natural language query based on the extracted information. A query is generated for retrieving data from a plurality of different data sources based on the extracted information. The data for the determined task is retrieved from the plurality of different data sources based on the generated query. The determined task is performed using the retrieved data. Embodiments of the present invention further include a method and computer program product for processing a natural language query in substantially the same manner described above.

BRIEF DESCRIPTION OF THE DRAWINGS

Generally, like reference numerals in the various figures are utilized to designate like components.

FIG. 4 is a flow diagram of a method for customizing the model for an operational environment according to an embodiment of the present invention.

FIG. 6 is a schematic illustration of an example user interface for receiving a natural language query to generate a trained machine learning model and presenting results according to an embodiment of the present invention.

DETAILED DESCRIPTION

Figure 1:
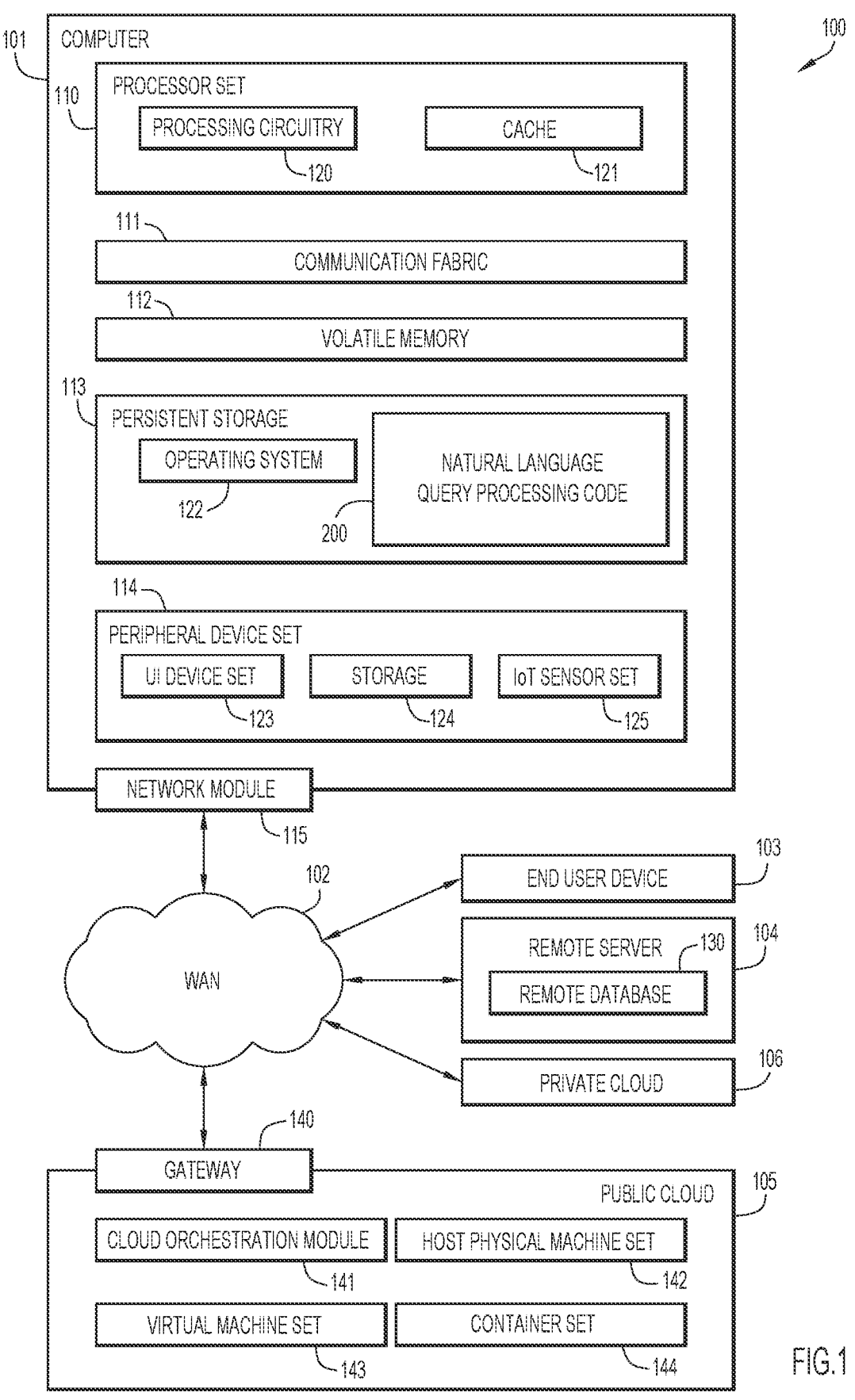
FIG. 1 is a diagrammatic illustration of an example computing environment according to an embodiment of the present invention.

A present invention embodiment provides a unified platform that provides an end-to-end automated experience for performing a task. For example, the unified platform may provide an end-to-end automated machine learning (AutoML/AutoAI) tool experience. In this case, data for generating machine learning models does not need to be moved, but may instead be queried directly from a database connection before being used in a machine learning scenario. This provides freedom to incorporate additional features to facilitate data pre-processing. By way of example, different options to perform intelligent sampling on a dataset may be incorporated into a query (e.g., SQL query, etc.) issued by a user.

A present invention embodiment provides a contextually aware cognitive query (e.g., Structured Query Language (SQL), etc.) assistant for auto-provisioning of dynamic completions or suggestions for a natural language query based on context (e.g., connections, data, tooling, etc.) and facilitating seamless integration of cloud agnostic data-lakes with an automated machine learning (AutoML/AutoAI) or other analytics framework. A natural language processing (NLP) engine may ingest a user intent of a partially constructed query to provide additional annotations and insights into completion and generation of the query, thereby enhancing user ability to provide integrated logic with a single unified command. A data (e.g., SQL) engine may generate and process the query to retrieve data based on specifications of the user, and performs actions to seamlessly integrate with an automated machine learning (AutoML/AutoAI) or other framework. Machine learning (ML) results may be retrieved from an AutoML/AutoAI or other service and displayed to the user in an easy to consume format. A best machine learning (ML) model may be deployed on connected data-lakes automatically. Introspection may be performed on a structure of the user data, and autocompletion may be provided for a natural language query during entry by the user.

Present invention embodiments bridge a gap between data and automated machine learning (AutoML/AutoAI) or other services by handling connection to proper data sources, unifying the data, and enabling a user to enter a natural language query to automatically initiate the automated machine learning (AutoML/AutoAI) or other process to generate a machine learning model or perform another task. Present invention embodiments enhance an AutoML/AutoAI or other pipeline and enable users to gain insights and learn from the data more efficiently.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code involved in performing the inventive methods, such as natural language query processing code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
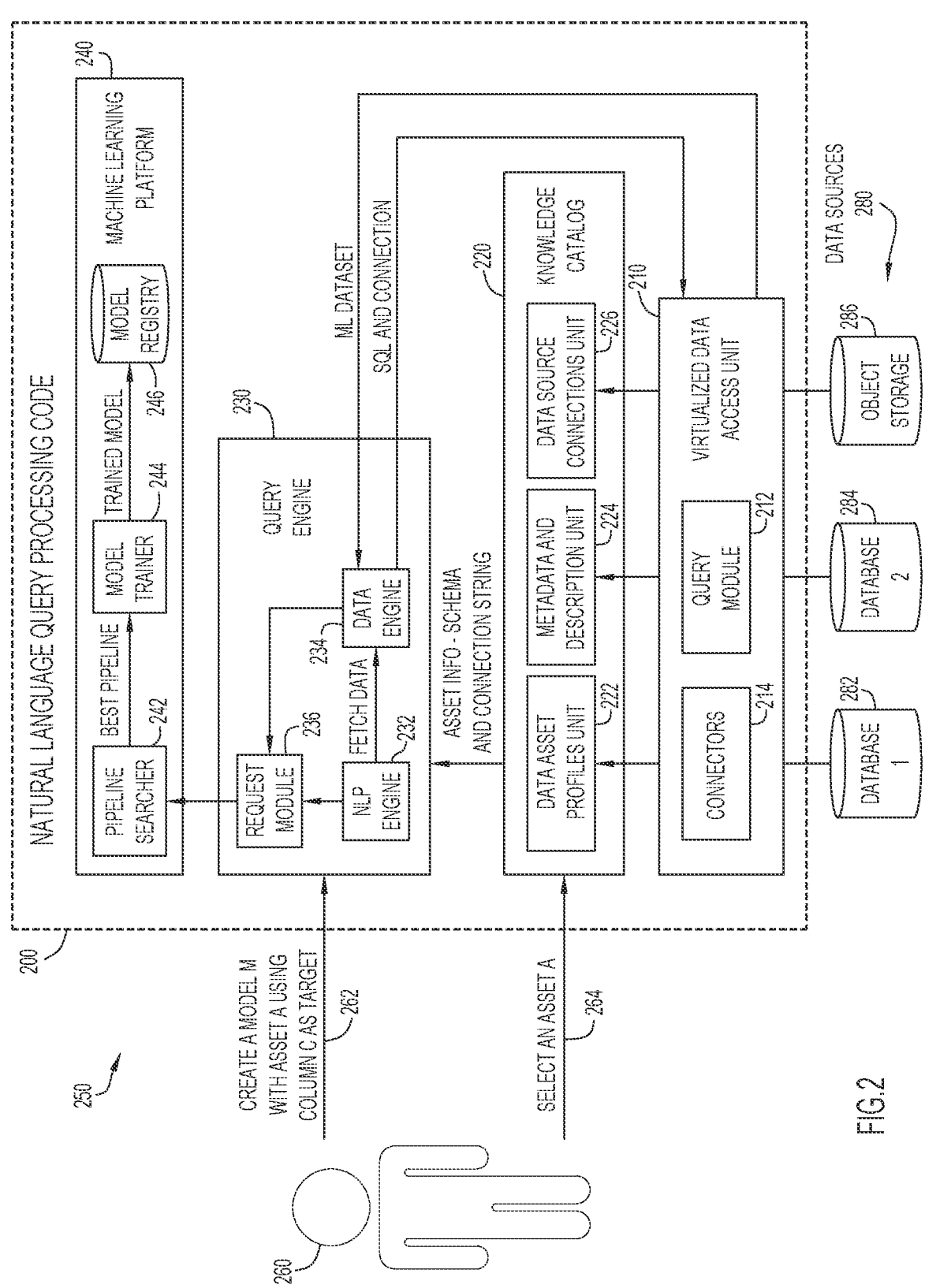
FIG. 2 is a block diagram of an architecture for processing a natural language query to perform a task according to an embodiment of the present invention.

An architecture 250 for processing a natural language query and performing a task according to an embodiment of the present invention is illustrated in FIG. 2. Initially, architecture 250 corresponds to an operational environment including a computer 101 with natural language query processing code 200 and data sources 280. The architecture basically provides a pipeline for performing tasks. By way of example only, a present invention embodiment is described with respect to a task of generating and training a target machine learning model. However, present invention embodiments may be employed for any desired tasks in substantially the same manner described below (e.g., by processing a natural language query for a task, retrieving data, and generating a request for an appropriate service for performing the task).

Data sources 280 include data that may reside in different sources or silos (e.g., data for an enterprise or operational environment, etc.). For example, relational data may be in heterogeneous formats (e.g., relational database management systems (RDBMS), spreadsheets, etc.) and locations (e.g., different RDBMs). Data sources 280 may include any quantity of any types of data sources. By way of example, data sources 280 include a database 282, a database 284, and an object storage 286. Each data source has corresponding connections and access control. However, copying all the data into a single data repository to simplify finding of the data may be impractical.

Natural language query processing code 200 implements a pipeline for performing a task, and includes a virtualized data access unit 210, a knowledge catalog 220, a query engine 230, and a machine learning platform 240. These items may be implemented as services or microservices of a cloud or other distributed computing environment. Virtualized data access unit 210 controls access to data sources 280 based on queries. The virtualized data access unit includes a query module 212 and connectors 214. The query module provides an interface to different types of data sources 280 (e.g., traditional (or structured) and non-traditional (or unstructured) data sources) using a same query language (e.g., Structured Query Language (SQL), etc.) to retrieve data. In other words, the query module may receive an SQL query and produce appropriate queries and/or instructions for different data sources to retrieve and/or process data from those different data sources according to the SQL query (even though a data source may not accommodate SQL). For example, query module 212 may enable join operations on data from different data sources based on a received SQL query. Connectors 214 provide connections to data sources 280 for transfer of data. The query module and connectors may be implemented by any conventional or other mechanisms for processing queries and establishing and maintaining connections for data sources.

Knowledge catalog 220 maintains information associated with data assets in data sources 280 (e.g., data dictionaries or glossaries providing descriptive terms for database tables or other assets, etc.). This information may be used to reference the data assets in data sources 280 (without using their actual data source names), such as in natural language queries. The data assets may include any corresponding data structure, object, or element (e.g., tables, rows, columns, fields, etc.). For example, the knowledge catalog may include a database table of assets and corresponding owners. Cataloging assets may include appending business terms and descriptions to corresponding assets, and capturing a statistical summary of assets in the catalog.

Knowledge catalog 220 includes data asset profiles unit 222, metadata and descriptions unit 224, and data source connections unit 226. The data asset profiles unit indicates features or information for a data asset in the knowledge catalog, while the metadata and descriptions unit maintains information describing the data assets (e.g., to enable mapping of the natural language to the data assets, etc.). The data source connections unit controls access to the data assets, and determines the presence of appropriate permissions for a user to access a requested data asset.

Query engine 230 processes a natural language query, and assists a user to retrieve a machine learning dataset from data sources 280 and initiate generation and training of a target machine learning model by machine learning platform 240. The user interacts with the query engine using natural language, and the query engine automatically generates the statements (e.g., SQL statements, etc.) for retrieving data from data sources 280 and a request for the machine learning platform to generate a trained target machine learning model. In addition, the query engine may perform an autocompletion operation as a user enters a query to provide suggestions for completing the query (e.g., table or column for training data, type of model, model deployment location, etc.).

Query engine 230 includes a natural language processing (NLP) engine 232, a data engine 234, and a request module 236. The NLP engine receives natural language queries from a user, and utilizes natural language processing (NLP) techniques and/or machine learning techniques to parse and translate the natural language to perform corresponding actions. For example, a user 260 may select an asset from knowledge catalog 220 at flow 264, and provide a natural language query 262 (e.g., "Create a model M with Asset A using column C as a target") to the NLP engine to generate a target machine learning model using the selected asset. The NLP engine may further perform autocompletion of natural language queries by suggesting keywords. The NLP engine may employ any conventional or other natural language processing techniques and/or machine learning models (e.g., entity extraction, relationship identification, semantic analysis, part-of-speech (POS) tagging, Latent Dirichlet Allocation (LDA), Transformer models, etc.).

Data engine 234 translates the natural language query to the query language (e.g., Structured Query Language (SQL), etc.) processed by query module 212. The query is used to retrieve data for training a target machine learning model from data sources 280 via virtualized data access unit 210. Request module 236 produces and provides a request to machine learning platform 240 to generate a target machine learning model. The data engine may further preprocess the retrieved data for the request. The request includes various parameters obtained or derived from the natural language query (e.g., a type of model, training data retrieved from data sources 280, etc.). The request module may further prompt a user for information (e.g., authorization, deployment location, machine or environment, etc.) to deploy the machine learning model after generation by machine learning platform 240.

Machine learning platform 240 processes the request and generates a trained target machine learning model. The machine learning platform includes a pipeline searcher 242, a model trainer 244, and a model repository 246. The pipeline searcher identifies one or more target machine learning models corresponding to the request. Once the target machine learning models are identified, model trainer 244 trains the target machine learning models using the training data retrieved from data sources 280. Model repository 246 stores the target machine learning models produced for the request, and may be implemented by any conventional or other storage structures (e.g., repository, database, object storage, etc.). The machine learning platform may further deploy a trained target machine learning model to a desired location, machine or environment based on information from a user provided to request module 236. The machine learning platform may be implemented by any conventional or other machine learning (AutoML/AutoAI) tools that generate machine learning (ML) models.

The workflow or pipeline for generating a target machine learning model encompasses static and varying assets. Static assets remain the same or fixed between different machine learning or artificial intelligence use cases. Static assets may include infrastructure components that are shared between different machine learning or artificial intelligence projects, such as the types of database management systems, model training systems, model repositories, and model serving systems.

Varying assets differ between machine learning or artificial intelligence use cases. Varying assets include data assets and use case domains that change between use cases and companies. For example, datasets and enterprise data catalogs from financial industries are different from those of the healthcare industries.

Architecture 250 detects user intent for a machine learning task since instructions for training particular types of machine learning models remain fairly constant between machine learning or artificial intelligence use cases. For example, a natural language query may include "Hey, train a regression model using the employee table from the human resources DB and salary as the target attribute." The initial part of the instruction, "Hey, train a regression model" is not dependent upon a business domain of the use cases. Rather, this type of expression pertains to generic data science matters. Accordingly, a machine learning or other model may be pre-trained that is able to identify this type of expression and map the expression to specific operations in a pipeline for generating a target machine learning model. With respect to domain and use case specific vocabularies, the pre-trained model may be fine-tuned with knowledge from the specific vocabularies.

Figure 3:
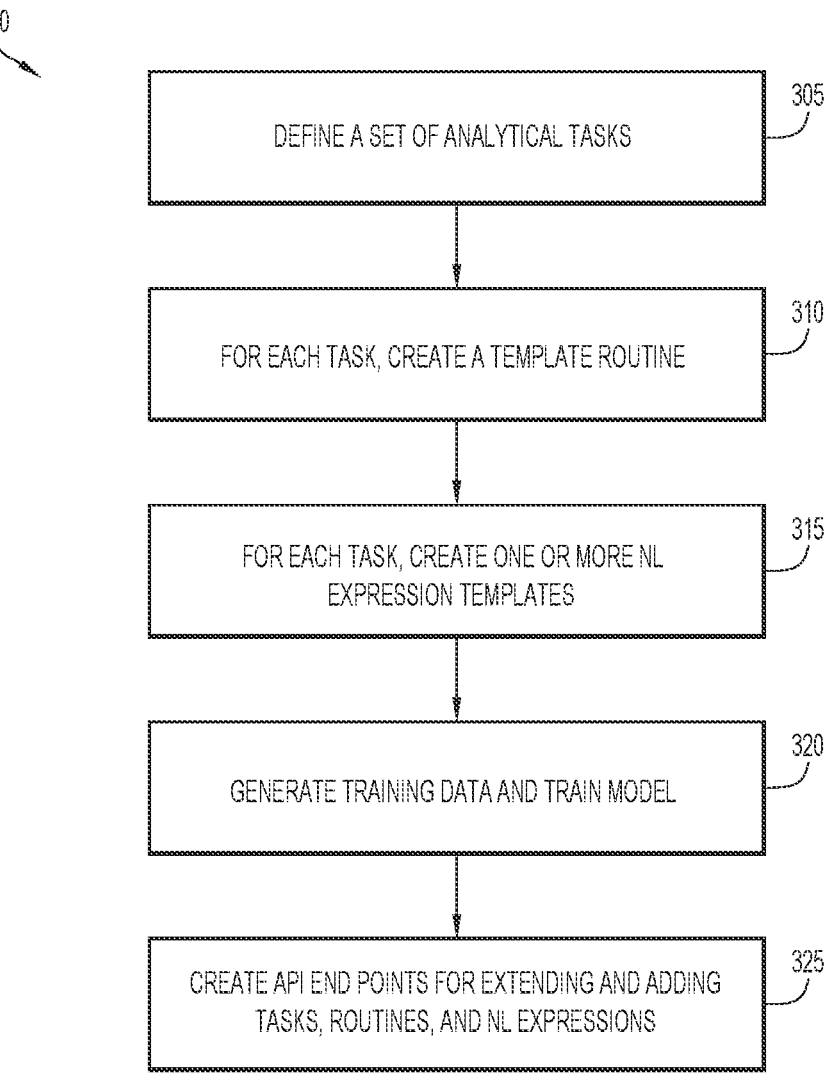
FIG. 3 is a flow diagram of a method of training a model to process a natural language query to perform a task according to an embodiment of the present invention.

A method 300 of training a model to process a natural language query to perform a task is illustrated in FIG. 3. In particular, a set of analytical tasks is defined at operation 305. The tasks may be provided by a user. The tasks may include various operations or actions to be performed based on a natural language command or query. For example, the tasks may include generating a target machine learning model, deploying the target machine learning model, creating a file or report, etc.

A template routine is created for each task at operation 310. This may be performed by a user and/or automatically by query engine 230. The template routine includes instructions or code statements for performing the corresponding task. One or more natural language expression templates are created for each task at operation 315. The natural language expression templates include natural language expressions that correspond to the task. For example, a set of natural language expressions may be selected that indicates various natural language commands or instructions to create target machine learning models. The types of supervised target machine learning models to be generated may include classification and regression type machine learning models. Further, query engine 230 may infer the machine learning task from a context even when a type of target machine learning model is not specified in a query (e.g., a numeric column indicated by a query corresponds to a regression task, etc.).

The natural language expression templates initially include placeholders pertaining to certain aspects of an operational environment (which are typically not known until deployment of query engine 230 in the operational environment as described below). The natural language expression templates may include a format indicating an action to perform, a target model, a table with data for training the target machine learning model, and an element of the table (e.g., table column, etc.) with data for training the target machine learning model. By way of example, natural language expression templates may be of the form:

Train a model with TABLE 1 using Column 1 as the
       target;

Build a model from the TABLE 1 with Column 1 as
       target; and

Create model using TABLE 1 as the dataset and Column
       1 as the target column.

"TABLE 1" and "Column 1" represent placeholders for a specific database table and table column from an operational environment.

Different training examples (or natural language expression templates) are generated for the tasks to produce a training data set, and a machine learning model of NLP engine 232 is trained to map natural language expressions to the tasks at operation 320. This may be performed by a user and/or query engine 230. For example, the query engine may re-order, add, and/or omit words in a natural language expression, and/or use various synonyms to generate training examples (or natural language expression templates). The training examples include the natural language expression templates with the references or placeholders ("TABLE 1" and "Column 1") for the database table and target attribute from the database table. Thus, the machine learning model of NLP engine 232 is initially trained with training data having placeholders (e.g., to map domain independent parts of the expression to pipeline operations as described above), and may be further trained with information from an operational environment for fine tuning or customizing to that operational environment as described below.

The training data set is used to train the machine learning model of NLP engine 232 to map natural language expressions or queries from a user to the tasks to perform. Any conventional or other machine learning models may be employed (e.g., mathematical/statistical, classifiers, feed-forward, recurrent or other neural networks, etc.). For example, neural networks may include an input layer, one or more intermediate layers (e.g., including any hidden layers), and an output layer. Each layer includes one or more neurons, where the input layer neurons receive input (e.g., natural language expressions, feature vectors, etc.), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, the neural network may be trained with natural language expressions (or feature vectors of the expressions) as input and corresponding classifications (e.g., tasks) as outputs. The feature vectors may include any features or characteristics of the expressions (e.g., word count, character count, frequency of terms, etc.), where the neural network attempts to produce the provided output (or classification) and uses an error from the output (e.g., difference between produced and known outputs) to adjust weight (and bias) values (e.g., via backpropagation or other training techniques). The output layer of the neural network indicates a classification for the input data. By way of example, the output layer neurons may indicate a specific classification (e.g., corresponding to a task). Further, output layer neurons may be associated with different classes and indicate a probability for the input data belonging to a class. The class associated with the highest probability is preferably selected as the classification (e.g., task) for the input.

The training data may be provided to the machine learning model of NLP engine 232. The machine learning model may receive a natural language expression or feature vector of the natural language expression, and produce a classification indicating the task for that expression. The classification may be compared to a known classification (or known task) for the natural language expression, and a difference may be used to adjust weights and/or bias values as described above. Once trained, the machine learning model is configured with respect to domain independent information (with references or placeholders for domain specific information), and may be further trained for fine tuning or customization to a specific operational environment when deployed as described below.

Application programming interface (API) endpoints are created at operation 325. The API endpoints are preferably used after deployment to an operational environment and enable extending (and/or adding) of tasks, routines, and/or natural language expressions (or natural language expression templates). In other words, the API endpoints enable customization based on information from an operational environment to re-train and fine tune the machine learning model to that environment.

A method 400 of customizing the model of NLP engine 232 for an operational environment according to an embodiment of the present invention is illustrated in FIG. 4. Initially, the machine learning model of NLP engine 232 may be trained with the natural language expression templates having reference or placeholders as described above. Query engine 230 may be deployed as a service in an operational environment (or architecture 250) at operation 405. The query engine obtains access to the environment resources at operation 410. The resources may include analytical services, such as virtualized data access unit 210, knowledge catalog 220, and machine learning platform 240 (e.g., including automated machine learning model generation, training, deployment, etc.).

The natural language expressions of the natural language expression templates are expanded and customized at operation 415. This may be based on information in knowledge catalog 220 (e.g., business or other glossaries, data assets, etc.). Query engine 230 may generate new natural language expression templates by replacing the reference or placeholders in the natural language expression templates with information from the knowledge catalog. For example, "TABLE 1" in the above natural language expression templates may be replaced with different database table names found in the knowledge catalog. Further, the reference or placeholder "Column 1" in the above natural language expression templates may be replaced with each column for a given table in the knowledge catalog. This expands the natural language expressions associated with a task.

The information in the knowledge catalog may be filtered based on context to reduce the number of natural language expression templates and/or training examples generated. For example, a table column with minimal or irrelevant information may be filtered (e.g., the table column is not used to replace the reference or placeholder for generating natural language expression templates or training examples, etc.). Further, query engine 230 may employ machine learning models (e.g., a neural network as described above, etc.) to learn the information to use for generating the natural language expression templates and training examples based on data assets or attributes specified by users in natural language queries.

A user may create and/or modify tasks and routines at operation 420. This may be accomplished by use of the application programming interface (API) endpoints. For example, query engine 230 may customize a template routine associated with a task with information from knowledge catalog 220 (e.g., specific data assets, attributes, etc.). Further, new and/or modified natural language expression templates may be produced based on creation and/or modification of tasks.

Additional or augmented training examples including the new or modified natural language expression templates (e.g., from replacement of placeholders with attributes, from new or modified tasks, etc.) are used to re-train the machine learning model of NLP engine 232 at operation 425. For example, the additional or augmented training examples (e.g., with or without the initial training data) may be provided to the machine learning model. The machine learning model may receive a natural language expression or feature vector of the training data, and produce a classification indicating the task for the expression. The classification may be compared to a known classification (or known task) for the natural language expression, and a difference may be used to adjust weights and/or bias values as described above. The re-trained machine learning model may interpret natural language instructions or queries that contain attributes (e.g., database table names and column names) of the environment in which query engine 230 is deployed.

Query engine 230 may be made available to users of the operational environment to receive natural language queries for generating target machine learning models at operation 430.

Figure 5:
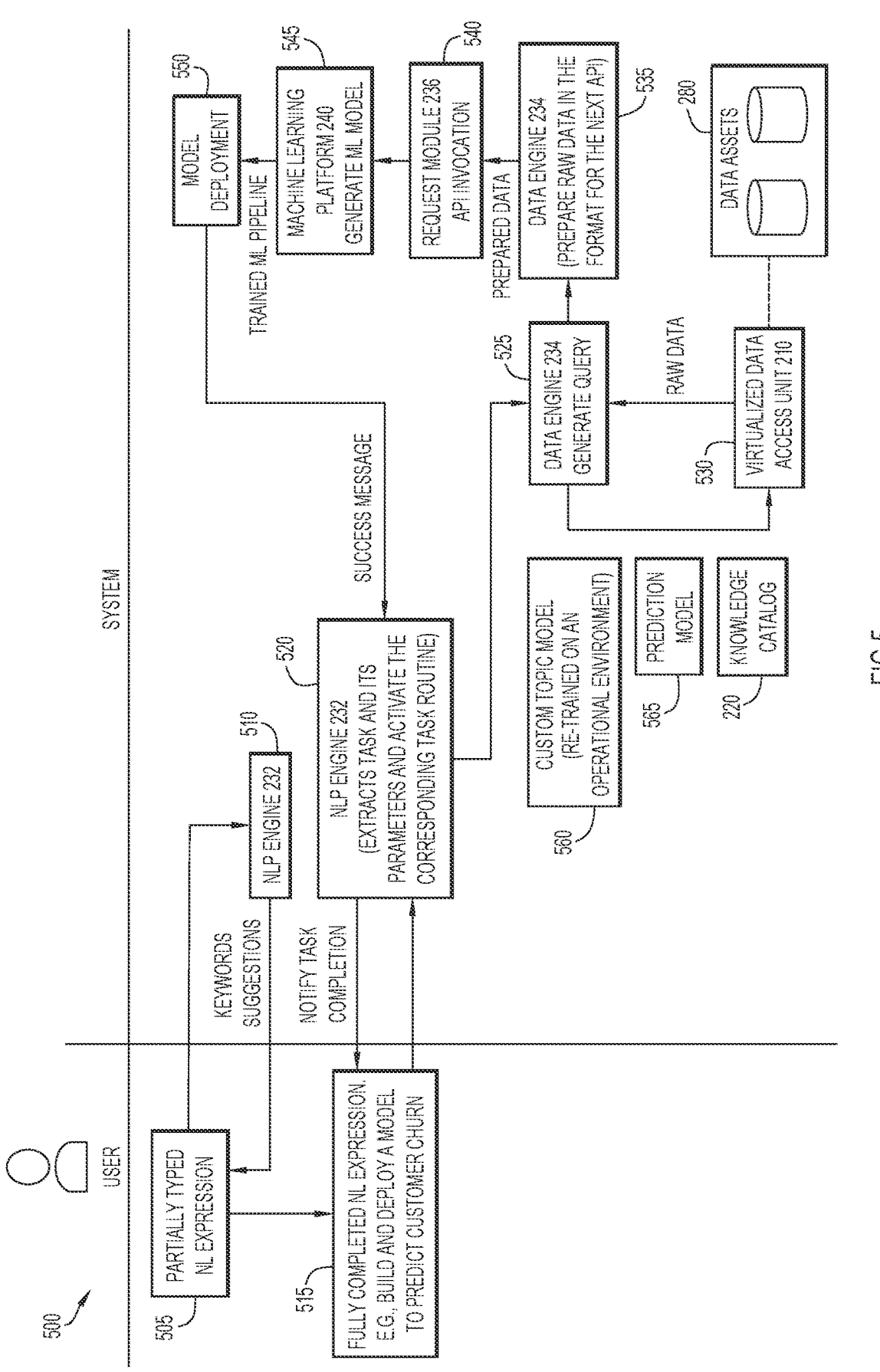
FIG. 5 is a flow diagram of a method for processing a natural language query to perform a task according to an embodiment of the present invention.

A method 500 for processing a natural language query to perform a task according to an embodiment of the present invention is illustrated in FIG. 5. By way of example only, a present invention embodiment is described with respect to a task of generating and training a target machine learning model. However, present invention embodiments may be employed for any desired tasks in substantially the same manner described below (e.g., by processing a natural language query for a task, retrieving data, and generating a request for an appropriate service for performing the task).

Initially, query engine 230 is deployed in an operational environment (or architecture 250) and customized for that environment in substantially the same manner described above. A user enters a partial natural language query on a user interface at operation 505. NLP engine 232 processes the partial query to produce suggestions for completing the query at operation 510. This may be accomplished by the NLP engine associating data assets and topics for auto-completion of natural language queries.

For example, when query engine 230 is deployed in the operational environment, a topic model 560 is trained for the specific operational environment based on schema definitions (e.g., data assets and contents, etc.) for the data sources. The topic model may include any conventional or other classification model and is trained to classify data assets and contents into topics. The topic model may include any conventional or other natural language processing (NLP) and/or machine learning models (e.g., Latent Dirichlet Allocation (LDA), mathematical/statistical, classifiers, feed-forward, recurrent or other neural networks as described above, etc.). The topic model may be trained in substantially the same manner described above using a training set of various corresponding words or word combinations and known topics.

Query engine 230 analyzes schema definitions for data sources (e.g., tables, columns, etc.) in knowledge catalog 220 to identify keywords from data assets and their contents. The data asset contents are processed by topic model 560 to classify the contents and corresponding data assets into topics The classifications are utilized for autocompletion of natural language queries as described below.

The partial query is processed by NLP engine 232 to identify keywords (e.g., task, data assets, etc.) in the query. This may be accomplished using any conventional or other natural language processing (NLP) techniques (e.g., entity extraction, relationship identification, semantic analysis, part-of-speech (POS) tagging, etc.). The identified keywords are processed by topic model 560 to determine topics for the partial query. Predictions or suggestions for completion of the query are determined based on the keywords associated with the data assets of the topic of the query. For example, the keywords and task of the query and the associated topics may be provided to a prediction model 565 to determine the keywords for completing the partial query. The prediction model may include any conventional or other natural language (NLP) processing and/or machine learning models (e.g., Transformer model, etc.). The prediction model may be trained in substantially the same manner described above using a training set of topics, keywords, and tasks, and various known subsequent keywords.

The user may select from the suggestions on the user interface and/or otherwise complete the query at operation 515. For example, the query may request a target machine learning model (e.g., "Build and deploy a model to predict customer churn" as viewed in FIG. 5). NLP engine 232 processes the completed query to initiate generation of the target machine learning model at operation 520. In particular, the NLP engine extracts task and corresponding parameters from the completed query. This may be accomplished using any conventional or other natural language processing (NLP) techniques (e.g., entity extraction, relationship identification, semantic analysis, part-of-speech (POS) tagging, etc.). The extracted information is provided to the customized machine learning model to determine the task as described above.

The template routine (e.g., customized to the operational environment as described above) associated with the determined task is executed to perform the task. In this case, data engine 234 is directed to retrieve data for the task from data sources 280 at operation 525. This may be accomplished by the data engine generating a query (e.g., SQL query) for processing by query module 212 of virtualized data access unit 210. The data engine may employ a rules-based approach to generate the query. For example, a rule may include one or more conditions and a query template that provides a format or syntax for a query. When the conditions of a rule are satisfied, corresponding parameters extracted or derived from the query may be inserted in the query template to form the query. For example, knowledge catalog 220 may be accessed to identify actual data asset attributes corresponding to the extracted parameters. The actual attributes may be used in the query template to form the query. In addition, the knowledge catalog may indicate various different data sources containing data for the task. The query may be used to retrieve the data from the different data sources. By way of example, the query template may include an actual query statement (e.g., SELECT, etc.) with placeholders for table and column names that may be replaced with corresponding attributes derived or extracted from the query. The conditions may indicate any conditions or events for using the query template (e.g., type of operation, type of task, etc.).

The query is processed by query module 212 at operation 530 to retrieve data from data sources 280. The query may enable data to be retrieved from different data sources as described above. Data engine 234 receives and preprocesses the retrieved or raw data into an appropriate format for performing the task at operation 535. The format may be based on the platform or service performing the task (e.g., the platform or service may require the data to be of a certain type, in a certain file, etc.). Request module 236 generates a request for (e.g., an API of) machine learning platform 240 to generate the requested machine learning model at operation 540. The request may have any format based on the platform performing the task, and may include any information or parameters (e.g., training data, target column, metrics for the model, the type of model, etc.). The information or parameters may be pre-configured and/or extracted from the query. Further, query engine 230 may infer a machine learning task from a context even when a type of target machine learning model is not specified in a query (e.g., a numeric column indicated by a query corresponds to a regression task, etc.).

Machine learning platform 240 processes the request and generates the target machine learning model at operation 545. In this case, pipeline searcher 242 identifies one or more target machine learning models corresponding to the request. Once the target machine learning models are identified, model trainer 244 trains the target machine learning models with the training data retrieved from data sources 280. Model repository 246 stores the target machine learning models produced for the request. The machine learning platform may provide various information to query engine 230 pertaining to generation of the machine learning models (e.g., machine learning models produced, corresponding accuracy or other metrics, etc.). The information may be presented on a user interface, where the user may select a desired target machine learning model.

Machine learning platform 240 may further deploy a trained target machine learning model to a desired location, machine, or environment at operation 550. The deployment may be automatic (e.g., pre-configured deployment location, etc.), or may be based on information from a user on the user interface and provided to request module 236. A message may be provided to NLP engine 232 indicating a status of the deployment (e.g., success or failure) and any corresponding information (e.g., reason for failure, etc.) for presentation to the user.

Operation of an embodiment of the present invention to generate a target machine learning model is illustrated in FIG. 6. Initially, a user enters a query 262 on a user interface 600 (e.g., "CREATE A MODEL M WITH ASSET A USING COLUMN C AS TARGET" as viewed in FIGS. 2 and 6). The asset is selected by the user from knowledge catalog 220. Query engine 230 processes the query and applies the query to the machine learning model to determine the corresponding task. The template routine corresponding to the determined task is executed to initiate generation of a trained target machine learning model. For example, the natural language query is processed to generate a structured query language (SQL) or other query to retrieve data from data sources 280 for training the target machine learning model as described above. The retrieved data and other parameters may be provided in a request to machine learning platform 240 to generate a trained target machine learning model according to the request. The parameters may be inferred, preconfigured, and/or extracted from the query as described above.

A command may be provided to the user interface to provide results 610 of the machine learning model generation. The results may indicate the training accuracy and corresponding type for selection of a target machine learning model.

Present invention embodiments provide various technical and other advantages. For example, present invention embodiments may automatically generate and deploy a trained machine learning model or perform other tasks with data retrieved directly from data sources. This avoids the need to copy large amounts of data between data sources, thereby conserving or reducing memory and computing resources. Further, the autocompletion of queries ensures proper queries are submitted, thereby avoiding processing of erroneous queries and improving performance.

Moreover, the machine learning model of NLP engine 232 may be initially trained with general data, and further re-trained with augmented data for customization to a specific operating environment. The initial training reduces the training iterations necessary to re-train the machine learning model. Further, the data used for augmenting the training data may be filtered to reduce the augmented training set and training iterations. These aspects reduce consumption of processing and memory/storage resources to improve computing performance.

In addition, the machine learning and other models may be continuously updated (or trained) based on feedback related to natural language queries and/or selected models. For example, a model may be selected, and the system may learn (e.g., update NLP and/or machine learning models) to automatically generate the selected model based on the same or similar natural language queries.

It will be appreciated that the embodiments described above and illustrated in the drawings represent only a few of the many ways of implementing embodiments for performing natural language query processing based on machine learning to perform a task.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system. These systems may include any types of monitors and input devices (e.g., keyboard, mouse, voice recognition, etc.) to enter and/or view information.

It is to be understood that the software of the present invention embodiments (e.g., virtualization data access unit 210 including query module 212 and connectors 214; knowledge catalog 220 including data set profiles unit 222, metadata and description unit 224, and data source connections unit 226; query engine 230 including NLP engine 232, data engine 234, and request module 236; machine learning platform 240 including pipeline searcher 242, model trainer 244, and model repository 246; etc.) may be implemented in any desired computer language and could be developed by one of ordinary skill in the computer arts based on the functional descriptions contained in the specification and flowcharts or flow diagrams illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts or flow diagrams may be modified in any manner that accomplishes the functions described herein. In addition, the functions in the flowcharts, flow diagrams, or description may be performed in any order that accomplishes a desired operation.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores, data sources, or storage structures (e.g., files, databases, data structures, data or other repositories, etc.) to store information. The database systems and data sources may be implemented by any number of any conventional or other databases, data stores, or storage structures (e.g., files, databases, data structures, data or other repositories, etc.) to store information. The database systems may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., model information, model selection, deployment information, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

A report may include any information arranged in any fashion, and may be configurable based on rules or other criteria to provide desired information to a user (e.g., models, model information or metrics, etc.).

The present invention embodiments are not limited to the specific tasks or algorithms described above, but may be utilized for processing a natural language query for performing any types of tasks (e.g., generating a target machine learning model, deploying the target machine learning model, creating a file or report, etc.).

The data sources may include any quantity of any types of data sources (e.g., databases, data stores, etc.), where the data assets may include any data structure, object, or element (e.g., tables, rows, columns, fields, etc.). The knowledge catalog may include any information describing or otherwise associated with the data assets and/or their contents (e.g., labels, descriptors, etc.). The tasks may include any quantity of any type of activity, operation, or action.

The natural language query and expressions may be in any form or format, and may include any quantity of any natural language elements (e.g., terms, words, phrases, sentences, etc.). The natural language expression templates may be of any form or format, and include any quantity of placeholders for any attributes.

The partial query may include any portion of the natural language query. The suggestions or predictions may be of any quantity, may include any attributes of the data assets, and may be in any form (e.g., actual attributes, descriptors of the attributes from the knowledge or other catalog, etc.).

The query to retrieve data from the data sources may be generated in any fashion. The rules may include any form or format, and specify any quantity of any conditions for selecting the rule. The query syntax may include any form or format, may include any query statement of any query or other language, and may include any quantity of placeholders for any attributes. The query may be used to access any quantity of different or the same types of data sources. The request for performing the task may be of any form or format, and may include any desired information (e.g., extracted or derived from the natural language query, preconfigured, metrics, etc.).

The various machine learning or other models (e.g., machine learning model of NLP engine 232, topic model, prediction model, etc.) may be implemented by any conventional or other natural language processing and/or machine learning models (e.g., Latent Dirichlet Allocation (LDA), mathematical/statistical, classifiers, feed-forward, recurrent or other neural networks, Transformer models, etc.). The training set for the machine learning model of NLP engine 232 may include the natural language expression templates or any variations thereof (e.g., re-order, synonyms, added or removed words, etc.). Any attributes from the knowledge catalog may be used for the placeholders to generate new natural language expression templates for the tasks. The attributes may be filtered based on any criteria to reduce the natural language templates and training data. The augmented training data may include the natural language expression templates with attributes for the placeholders or any variations thereof (e.g., re-order, synonyms, added or removed words, etc.). In addition, the training data may include any modified or new natural language expression templates for the tasks, or any variations thereof.

The topics may include any topics that may be predetermined, and/or derived from the data assets or knowledge catalog information. The keywords may include any attributes of the tasks, target machine learning models, and/or data assets.

The target machine learning model may be initially generated from a library of template or skeleton models of various types and configurations. The pipeline searcher may match a request to a machine learning model based on any criteria (e.g., model type, training data used, etc.). The model trainer may employ any conventional or other techniques to train the models with the data retrieved from the data sources.

The target machine learning model may be deployed automatically or in response to an authorization to any desired location, machine, or environment.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of processing a natural language query requesting performance of a task, the method comprising:

training, via at least one processor, a machine learning model of the at least one processor using natural language expression templates with placeholders for attributes, wherein the natural language expression templates are used to train the machine learning model to map natural language expressions to one or more tasks, wherein each task, of the one or more tasks, is associated with a corresponding template routine including instructions or code statements for performing a corresponding task;

extracting, via the at least one processor, information from the natural language query;

determining, via the machine learning model and based on the extracted information, a task that corresponds to the performance of the task requested by the natural language query;

generating, via the at least one processor, a query for retrieving data from a plurality of different data sources based on the extracted information;

retrieving, via the at least one processor, the data for the determined task from the plurality of different data sources based on the generated query;

preprocessing, via the at least one processor, the retrieved data into a format appropriate for performing the determined task based on requirements of a platform or service for performing the determined task, wherein preprocessing the retrieved data comprises:

applying a rules-based approach that selects one or more query templates based on conditions satisfied by the extracted information, and replacing placeholders in the selected one or more query templates with data asset attributes derived from a knowledge catalog; and performing, via the at least one processor, the determined task using the retrieved data and a template routine corresponding to the determined task.

2. The method of claim 1, wherein the performance of the task requested by the natural language query includes generating a target machine learning model.

3. The method of claim 2, wherein performing the determined task comprises:

generating the target machine learning model; and training the target machine learning model using the retrieved data as training data.

4. The method of claim 2, further comprising:

deploying, via the at least one processor, the target machine learning model to a desired environment.

5. The method of claim 1, further comprising:

determining, via the at least one processor, one or more suggestions to complete the natural language query in response to receiving a partial query.

6. The method of claim 5, wherein determining one or more suggestions comprises:

classifying data assets and corresponding content from the plurality of different data sources into topics based on a machine learning topic model, wherein keywords are associated with the topics;

classifying the natural language query into the topics based on the machine learning topic model; and determining, via a machine learning prediction model, one or more keywords of the topics of the natural language query to serve as the one or more suggestions based on the task requested by the natural language query and the extracted information.

7. The method of claim 1, further comprising:

generating, via the at least one processor, training data including the natural language expression templates with the placeholders replaced with attributes from an operational environment; and re-training, via the at least one processor, the machine learning model with the training data to customize the machine learning model for the operational environment.

8. A system for processing a natural language query requesting performance of a task, the system comprising:

one or more memories; and at least one processor coupled to the one or more memories, the at least one processor configured to:

train a machine learning model using natural language expression templates with placeholders for attributes, wherein the natural language expression templates are used to train the machine learning model to map natural language expressions to one or more tasks, wherein each task, of the one or more tasks, is associated with a corresponding template routine including instructions or code statements for performing a corresponding task;

extract information from the natural language query;

determine, via the machine learning model and based on the extracted information, a task that corresponds to the performance of the task requested by the natural language query;

generate a query for retrieving data from a plurality of different data sources based on the extracted information;

retrieve the data for the determined task from the plurality of different data sources based on the generated query;

preprocess the retrieved data into a format appropriate for performing the determined task based on requirements of a platform or service for performing the determined task, wherein preprocessing the retrieved data comprises:

applying a rules-based approach that selects one or more query templates based on conditions satisfied by the extracted information, and replacing placeholders in the selected one or more query templates with data asset attributes derived from a knowledge catalog; and perform the determined task using the retrieved data and a template routine corresponding to the determined task.

9. The system of claim 8, wherein the performance of the task requested by the natural language query includes generating a target machine learning model, and wherein performing the determined task comprises:

generating the target machine learning model; and training the target machine learning model using the retrieved data as training data.

10. The system of claim 9, wherein the at least one processor is further configured to:

deploy the target machine learning model to a desired environment.

11. The system of claim 8, wherein the at least one processor is further configured to:

determine one or more suggestions to complete the natural language query in response to receiving a partial query.

12. The system of claim 11, wherein determining one or more suggestions comprises:

classifying data assets and corresponding content from the plurality of different data sources into topics based on a machine learning topic model, wherein keywords are associated with the topics;

classifying the natural language query into the topics based on the machine learning topic model; and determining, via a machine learning prediction model, one or more keywords of the topics of the natural language query to serve as the one or more suggestions based on the task requested by the natural language query and the extracted information.

13. The system of claim 8, wherein the at least one processor is further configured to:

generate training data including the natural language expression templates with the placeholders replaced with attributes from an operational environment; and re-train the machine learning model with the training data to customize the machine learning model for the operational environment.

14. A computer program product for processing a natural language query requesting performance of a task, the computer program product comprising one or more computer readable storage media having program instructions collectively stored on the one or more computer readable storage media, the program instructions executable by at least one processor to cause the at least one processor to:

train a machine learning model using natural language expression templates with placeholders for attributes, wherein the natural language expression templates are used to train the machine learning model to map natural language expressions to one or more tasks, wherein each task, of the one or more tasks, is associated with a corresponding template routine including instructions or code statements for performing a corresponding task;

extract information from the natural language query;

determine, via the machine learning model and based on the extracted information, a task that corresponds to the performance of the task requested by the natural language query;

generate a query for retrieving data from a plurality of different data sources based on the extracted information;

retrieve the data for the determined task from the plurality of different data sources based on the generated query;

preprocess the retrieved data into a format appropriate for performing the determined task based on requirements of a platform or service for performing the determined task, wherein preprocessing the retrieved data comprises:

applying a rules-based approach that selects one or more query templates based on conditions satisfied by the extracted information, and replacing placeholders in the selected one or more query templates with data asset attributes derived from a knowledge catalog; and perform the determined task using the retrieved data and a template routine corresponding to the determined task.

15. The computer program product of claim 14, wherein the performance of the task requested by the natural language query includes generating a target machine learning model.

16. The computer program product of claim 15, wherein performing the determined task comprises:

generating the target machine learning model; and training the target machine learning model using the retrieved data as training data.

17. The computer program product of claim 15, wherein the program instructions executable by the at least one processor further cause the at least one processor to:

deploy the target machine learning model to a desired environment.

18. The computer program product of claim 14, wherein the program instructions executable by the at least one processor further cause the at least one processor to:

determine one or more suggestions to complete the natural language query in response to receiving a partial query.

19. The computer program product of claim 18, wherein determining one or more suggestions comprises:

classifying data assets and corresponding content from the plurality of different data sources into topics based on a machine learning topic model, wherein keywords are associated with the topics;

classifying the natural language query into the topics based on the machine learning topic model; and determining, via a machine learning prediction model, one or more keywords of the topics of the natural language query to serve as the one or more suggestions based on the task requested by the natural language query and the extracted information.

20. The computer program product of claim 14, wherein the program instructions executable by the at least one processor further cause the at least one processor to:

generate training data including the natural language expression templates with the placeholders replaced with attributes from an operational environment; and re-train the machine learning model with the training data to customize the machine learning model for the operational environment.

* * * * *